April 23, 1935.　　　J. E. PORTER　　　1,998,636
INTAKE MANIFOLD HEATING DEVICE
Filed Nov. 17, 1933　　　2 Sheets-Sheet 1

INVENTOR.
John E. Porter.
BY
ATTORNEY.

April 23, 1935.  J. E. PORTER  1,998,636

INTAKE MANIFOLD HEATING DEVICE

Filed Nov. 17, 1933   2 Sheets-Sheet 2

INVENTOR.
John E. Porter.
BY
E. H. Davis
ATTORNEY.

Patented Apr. 23, 1935

1,998,636

UNITED STATES PATENT OFFICE

1,998,636

INTAKE MANIFOLD HEATING DEVICE

John E. Porter, Windsor, Ontario, Canada, assignor to Ford Motor Company, Dearborn, Mich., a corporation of Delaware Application November 17, 1933, Serial No. 698,447

12 Claims. (Cl. 123—122)

The object of my invention is to provide a device for heating the gaseous fuel used in an internal combustion engine during its passage through the intake manifold of the engine. My device is especially adapted for use on the V-type motors, such motors being characterized by having two exhaust manifolds, one extending along each outer side of each cylinder block with an intake manifold disposed within the V formed by the two blocks. In the past it has been customary to pre-heat such an intake manifold by forming a chamber around its center portion, which chamber was connected with the exhaust manifolds of both blocks of cylinders, whereby an alternate or cross flow of exhaust gases through this chamber occurred. This cross flow was due to the alternating pulsations in the exhaust manifold of the two blocks. Such an arrangement has proven satisfactory when operating under a fairly constant temperature as the heating chamber can be constructed to raise the gas temperature any reasonable amount. However, an automobile engine must be operated at widely different temperatures, such as occurs in summer and winter driving and under such conditions, a satisfactory compromise has heretofore not been obtained. The size of the manifold heating chamber is, of course, constant so that if such is made large enough for winter conditions then the intake gases will be heated too high in the summer so as to cut down the volumetric efficiency of the engine, and on the contrary if the heating chamber is small enough to operate satisfactorily in the summer, then in winter the gas will not be heated sufficiently to thoroughly vaporize the fuel.

The object of my invention is therefore to provide a means whereby the gaseous fuel used in V-type motors will be heated sufficiently to cause complete vaporization both in summer and winter, and at the same time to provide means for regulation of such heating so that no appreciable loss in efficiency occurs from overheating the fuel.

I propose to accomplish this by forming a chamber around the intake manifold and connecting same to both exhaust manifolds in the conventional manner. This construction is supplemented by a device which forces approximately all of the exhaust gases from one manifold through the heating chamber, when the engine itself is cold, when the temperature of the air is low, or when the engine is operating at the normal or idling speed. At high engine speed or when the engine is operating in a moderate temperature this by-passing device will become ineffective, to thereby allow the manifold heating chamber to function only by the conventional cross flow principle. The result of this arrangement is that in the summer time approximately all the exhaust gases from one cylinder block are directed through the heating chamber only until the engine warms up to normal operating temperature, whereas in the winter time approximately all of the exhaust gases from one cylinder block pass through the heating chamber when the engine is idling and a portion of these gases pass through the chamber even while the engine is operating at high speed. The device is operated by a thermostat so that the operation varies between the two limits just described.

With these and other objects in view, my invention consists in the arrangement, construction and combination of the various parts of my improved device, as described in the specification, claimed in my claims, and illustrated in the accompanying drawings, in which:

Figure 6:
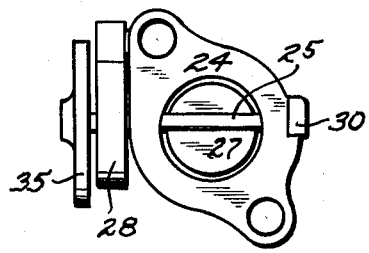
Figure 5:
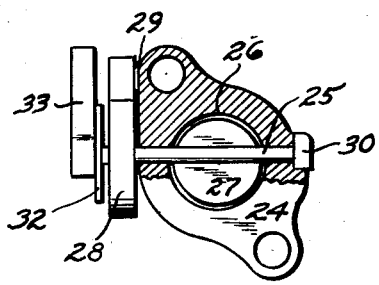

Figure 5 shows a plan view of my improved device, illustrating its compactness and simplicity of construction, and Figure 6 shows a plan view of an alternate construction wherein the gravity actuated weight associated with my device is dispensed with and a relatively large and heavy disc substituted therefor, the inertia of which functions to produce a result in some respects similar to the results produced by the aforementioned gravity-operated weight.

Figure 2:
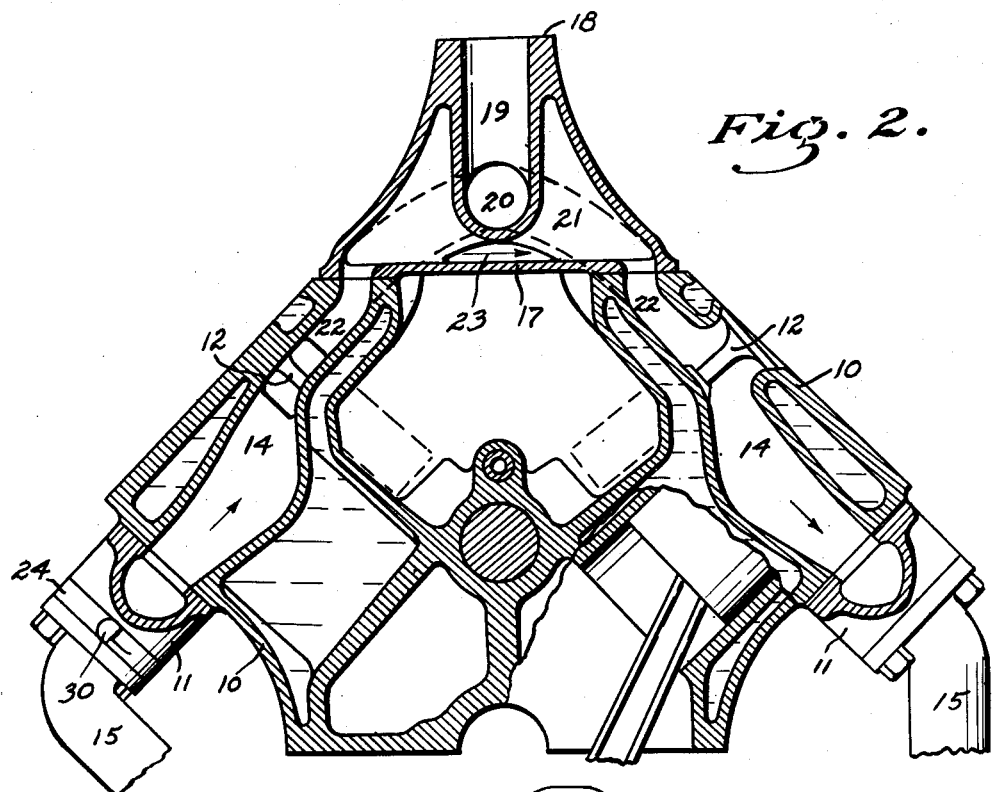
Figure 2 shows a central sectional view through a V-8 engine, illustrating the intake manifold heating arrangement used on said engine.
Figure 1:
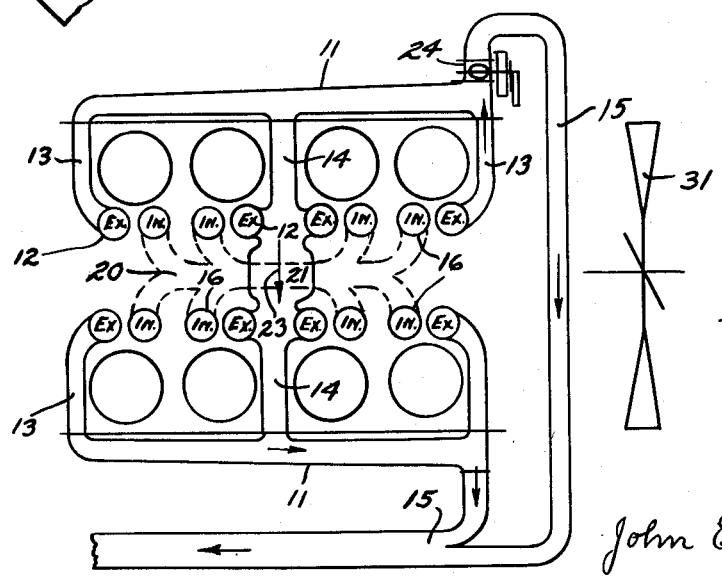
Figure 1 shows a diagrammatic view of a V-type motor illustrating both the intake and exhaust manifolding and its relation to my improved device.

Referring to the accompanying drawings, I have used the reference numeral 10 to indicate generally the cylinder block casting of a V-8 engine. As the design of this engine forms no part of my invention, only the elements thereof which cooperate with my improved valve mechanism will be described herein. The cylinder block casting 10 comprises two rows of four cylinders each, disposed at a 90° angle to each other so that pistons therein may act upon a common crank shaft. A pair of exhaust manifolds 11 are secured to the respective outer sides of the cylinder blocks although the valves associated with said engine are secured in the V between the two cylinder blocks. As shown in Figure 1, the exhaust valve 12 of each end cylinder in each block is in communication with a port 13 which is cast in each cylinder block and which extends transversely therethrough so as to connect with the exhaust manifolds. The exhaust valves of the center cylinders are connected to ports 14 which extend transversely through the blocks between the two center cylinders and which ports likewise discharge into the exhaust manifolds 11. The forward end of each exhaust manifold 11 is provided with an opening to which an exhaust pipe is normally secured. Referring to Figure 2, the right-hand exhaust manifold discharges into one branch of an exhaust pipe 15 while the left-hand manifold discharges into the other branch of this exhaust pipe which extends down beneath the engine and joins the first branch to form a common pipe to convey the exhaust gases to the rear of the car.

It will be noted that both exhaust valves 12 and intake valves 16 are disposed side by side in the conventional manner and that the intake valves are supplied by intake ports which are all connected with a common intake manifold passageway, shown by dotted lines in Figure 1. This passageway is cast in a combined manifold and cover plate 17 which is secured over the top face of the cylinder block 10 to form a closure for the valve chamber between the two blocks of the engine. A carburetor is secured to a suitable flange 18 formed on the cover 17 whereby gases may be drawn from the carburetor down through a vertical passageway 19 into a longitudinally extending passageway 20, this passageway 20 having branch arms leading off to each of the intake valves so that fuel is supplied to these valves in the ordinary manner.

In order to heat the incoming gases so as to vaporize the fuel, the motor just described is provided with a chamber 21 formed therein around the junction of the passageways 19 and 20. This chamber is substantially in line with the two center exhaust ports 14 and consequently the designers of this engine have extended the exhaust ports 14 upwardly, as at 22, so as to communicate with a pair of openings in the wall of the chamber 21. When the cover plate 17 is installed in position a continuous passageway is formed from one of the ports 14 up through the chamber 21 and back to the opposite port 14. Generally speaking, V-type motors have firing orders which alternate back and forth between the cylinders in the respective blocks so that exhaust gases will at one instant flow through the chamber 21 in the direction shown by arrow 23 and then at the next instant will flow in the opposite direction. Considerable heating is obtained by this cross flow which is sufficient for summer driving.

The foregoing has been described to show that during the normal operation of this engine under all climatic conditions the intake gas is heated only by the cross flow principle. The device about to be described comprises a restricting valve disposed between one of the manifolds 11 and its exhaust pipe 15 which functions under predetermined conditions to restrict the flow of exhaust gas through the pipe 15 thereby forcing the major portion of the exhaust gases of one cylinder block through the center port 14 and chamber 21 to thereby much more efficiently heat the gases entering from the carburetor.

This device comprises a butterfly type of valve and is adapted to be conveniently inserted between one manifold and its exhaust pipe and which is spring urged to its closed position by a temperature responsive spring. The axis of the valve proper is offset from its geometric center so that high pressure within the manifold will cause the valve to open against the action of its spring. Further, the spring itself is of bi-metal construction, preferably brass and invar steel, so that upon being heated to a certain temperature it loses its tension to thereby reduce or entirely relieve the closing pressure on the valve. A weight is associated with the valve proper which prevents fluttering of the valve.

The exact structure used comprises a flat insert 24 having a central opening 26 therethrough which is of the same size and shape as the opening between the exhaust manifold 15 and the exhaust pipe. This insert is secured in place by the similar but longer bolts which secure the exhaust pipe to the manifold. A shaft 25 is rotatably mounted in the insert 24 in position offset somewhat from the center of the opening 26 with its axis substantially horizontal when the insert is secured in position between the manifold and exhaust pipe. A vane 27 is secured to the shaft 25 within the opening 26, this vane being shaped as a disc having an approximate area of 85% of the area of the opening 26 so that an appreciable space exists between the edges of the vane 27 and the opening 26. Consequently, some gases will be allowed to flow around this butterfly valve even when it is in its closed position.

Figure 4:
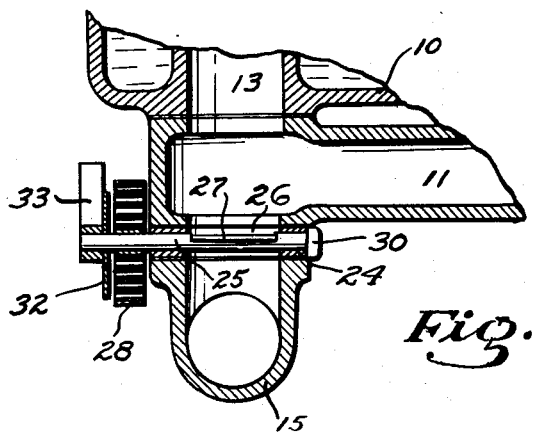
Figure 4 shows a sectional view, taken on the line 4—4 of Figure 3.

As will be seen from Figure 4, the center turn of a helical spring 28 is secured to the shaft 27 where it projects outwardly through the forward edge of the insert 24, and the outer end of this spring bears against a lug 29 formed on the insert. The opposite end of the shaft 25 is formed with a flat-sided head 30 which allows the shaft 25 to rotate only through substantially 90 degrees. This construction is shown in Figure 2.

The spring 28 is constructed of two strips of metal having different coefficients of expansion, for example: brass and invar, and the device is so proportioned that when the temperature of the surrounding air reaches approximately 120 degrees the spring will have expanded or uncoiled itself sufficiently to release all tension upon the shaft 25 which tends to hold the valve 27 in its closed position. It will be noted that the butterfly opens gradually as the engine warms up, and does not open suddenly. The heat for operating this spring is partly obtained by conduction through the insert 24 itself, through the shaft 25, and partly from the heat of the air being drawn through the vehicle radiator. As this insert is disposed directly in the rear of an engine fan 31, the blast of air therefrom would ordinarily render the device almost solely responsive to the temperature of the air in the engine compartment. In order to prevent this and to secure the desired functioning of the device I provide a thin metal disc 32 which is secured to the shaft 25 directly ahead of the spring 28 and which partially shields the spring from the air blast of the fan. However, the outer coil of the spring is still subject to the fan blast so that the action of this portion is affected considerably by the air which is drawn through the radiator.

Figure 3:
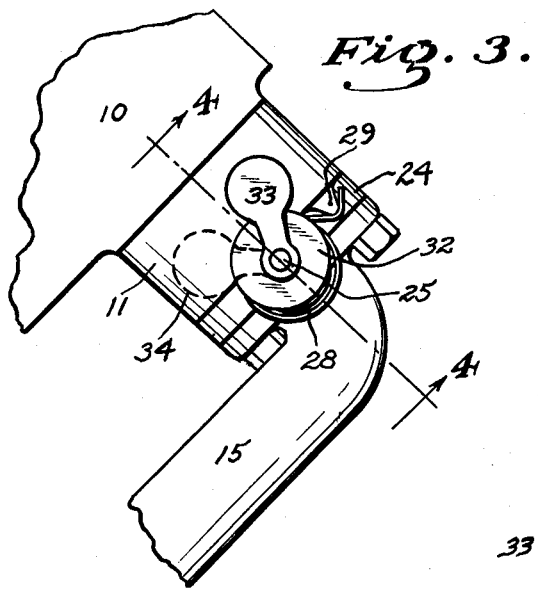
Figure 3 shows a front view of my improved regulating device when installed in position on the engine shown in Figure 2.

It will be noted from Figure 4 that the insert 24 is located in line with the front port 13 in the adjacent cylinder block so that the intermittent pulsation of the exhaust gas through this port ordinarily would cause the valve to flutter. To prevent this I have secured a weight 33 to the forward end of the shaft 25 which weight is mounted in position shown in Figure 3 when the valve is closed, and is located in the position shown by dotted lines 34 when the valve is open. This weight, acting with the head 30, retains the device in a fixed operating position for each temperature and thereby prevents rattling of the spring and valve, due to pulsations of gas pressure in the exhaust manifold.

The operation of my device is as follows: When the engine is being initially started in the summer as a cold motor, the spring 28 tends to keep the valve 27 in its closed position. If the engine is idling, the spring tension is sufficient to retain the valve in this closed position to thereby deflect approximately 85% of the exhaust gases of the adjacent cylinder block through the heating chamber 21. It is only when the engine heats up to normal running temperature that the tension of the spring 28 is reduced sufficiently to partially open under idling conditions. If under these conditions the engine is accelerated, the gas pressure in the exhaust manifold increases so that the valve opens due to its offset axis and the motor then functions in the conventional manner.

If, however, a cold motor is being started in freezing weather, then the tension of the spring 28 is increased so that the valve remains closed even after the engine has warmed up to the temperature normally attained when idling. Consequently, the valve 27 remains closed, due to the effect of the cold air upon the spring 28. If under these conditions the engine is accelerated, then the pressure of the gas in the manifold 11 increases until the valve 27 is opened partially at least.

Referring to Figure 6, I have shown an alternate construction wherein a relatively heavy disc 35 is substituted for the weight 33 and disc 32. The disc 35 is much thicker than the disc 32 and consequently has greater inertia, this inertia preventing fluttering of the shaft and the valve 27. While the relatively heavy disc 35 does not tend to maintain the valve in any predetermined position still its increased weight tends to prevent fluttering of the valve in any of its positions.

A feature of great importance in connection with this device is that when the vane 27 is closed to cause maximum heating of the intake, the exhaust gases from the two center cylinders of the adjacent cylinder block are directed upon the intake passageway to be heated before being conducted into a manifold of any description. This causes the intake passageway to heat up quicker than would be possible if the gases were conducted first to an exhaust manifold and then bypassed to the passageway to be heated. The latter arrangement is universally used in all conventional thermostatic heat control devices with which the applicant is familiar.

Among the many advantages arising from the use of my improved device it may be well to mention that this device is an accessory especially adapted for convenient attachment to a V-8 engine and particularly adapted for use in cold climates which are subject to extreme temperature variations from summer to winter. The device is believed unique in that no alterations, holes to be drilled, or changes of any description in the existing parts of the Ford engine are required, except the bolts which secure the device in place. In this respect the device differs materially from any other thermostatic heat controlling device with which the applicant is familiar.

Some changes may be made in the arrangement, construction and combination of the various parts of my improved device without departing from the spirit of my invention, and it is my intention to cover by the claims, such changes as may reasonably be included within the scope thereof.

I claim as my invention:

1. An internal combustion engine having an exhaust valve port therein, a pair of independent passageways extending from said port through each of which a portion of the exhaust gas is discharged, an intake manifold heating chamber disposed in one of said passageways, and a valve disposed in the other of said passageways, the closing of which causes an increased portion of exhaust gas from said port to flow directly to said heating chamber said valve being spring urged to its closed position and being both temperature responsive and pressure responsive so that an increase in either temperature or exhaust gas pressure will cause said valve to open.

2. An engine, as claimed in claim 1, wherein said valve when closed restricts only a portion of the passageway in which it is disposed.

3. An accessory for use on V-type engines having separate exhaust manifolds for each bank of cylinders, which manifolds are connected to individual exhaust pipes, and there being an intake manifold heating chamber connected to said manifold comprising, a plate adapted to be inserted between one exhaust manifold and the adjacent exhaust pipe of said engine, said plate having an opening therethrough aligned with the discharge opening in said manifold, and a butterfly-type valve disposed in said opening, said valve forming only a partial closure for said opening.

4. A device, as claimed in claim 3, wherein said butterfly valve is resiliently urged to its closed position and wherein said valve is eccentrically mounted so that it is self-opening upon an increase in exhaust gas pressure.

5. A device, as claimed in claim 3, wherein said butterfly valve is resiliently urged to its closed position by means of a bi-metallic spring which allows said valve to open upon the engine attaining its normal operating temperature together with a moderate temperature of the surrounding air.

6. A device, as claimed in claim 3, wherein said butterfly valve is resiliently urged to its closed position by means of a bi-metallic coil spring and is urged in a lesser degree to its open position by means of a gravity actuated weight, and wherein said valve is eccentrically mounted so that an increase in exhaust gas pressure will cause it to open against the force of said spring.

7. In a V-block type of automotive internal combustion engine having an exhaust manifold on either side discharging at its forward end, and a cross flow conductor from the central portion of each of said manifolds opening into a heating jacket about the intake manifold, a means of controlling the flow of exhaust gas through said heating jacket comprising a butterfly-type damper located in the discharge from one exhaust manifold, a spindle for same mounted eccentrically, a bi-metallic coil spring attached to said spindle outside of the manifold and forwardly therefrom in a manner tending to hold the damper closed against the pressure of the exhaust gas, said spring being arranged to relax its closing pressure with a rise in temperature of the exhaust manifold and surrounding air, a weighted arm on said spindle tending to open said valve by gravity and to hold it open, and a shield attached to the spindle partially covering said bi-metallic coil spring.

8. In a V-block type of automotive internal combustion engine having an exhaust manifold on either side, an inlet mixture heating means comprising a jacket chamber about the inlet passageway with conductors therefrom to each of the said exhaust manifolds, a means of controlling the inlet temperature consisting of an eccentric butterfly damper in the discharge from one exhaust manifold, a damper spindle passing to the atmosphere, a bi-metallic coil spring mounted thereon tending to urge the damper closed against the pressure of the discharging gas and arranged to relax said urging as the temperature rises, a disc shield mounted on the spindle in front of said coil spring, and a weighted arm mounted on the spindle tending to hold open the damper by gravity.

9. In an internal combustion automobile power plant consisting of a V-type engine having an exhaust manifold along each side, the whole enclosed under a hood, and having means of heating the inlet mixture by the exhaust gas flowing principally directly from the cylinder exhaust valves to an inlet heating jacket and then to an exhaust manifold, thermostatic means of controlling the degree of heating of the mixture actuated by the temperature of the exhaust manifold and the under hood temperature comprising an eccentrically mounted butterfly damper in the discharge passage from one exhaust manifold and partially closing said passage, said damper being mounted upon a pivot spindle which extends externally through the exhaust passageway wall, a bi-metallic temperature responsive coil spring mounted externally on said spindle so as to strongly oppose the opening of the butterfly valve under the impulse of outflowing gas when cool and less strongly opposing said opening when hot, a weighted arm on said spindle tending to hold open said valve, and a plain shield on said spindle adjacent to the coil spring.

10. In an internal combustion automobile power plant consisting of a V-type engine having an exhaust manifold along each side, the whole enclosed under a hood, an inlet mixture heating jacket and a passage therefrom to each of the exhaust manifolds with exhaust valves opening into each passage between the manifold and the jacket, means of controlling the temperature of the inlet mixture consisting of a butterfly-type valve eccentrically mounted in the discharge passage of one exhaust manifold, a rotatable spindle attached to said valve and extending externally through the wall of the passage, a weighted arm mounted thereon tending to open the valve by gravity, a temperature responsive coil spring attached externally to said spindle to close the valve against the exhaust pressure when cold and permit its readier opening when hot, and an air shield mounted on said spindle adjacent to the coil spring.

11. An internal combustion engine having an exhaust valve port therein, a pair of independent passageways extending from said port adapted to each discharge a portion of the exhaust gases, an intake manifold heating chamber disposed in one of said passageways, a valve disposed in the other passageway, means for mounting said valve so that pressure in said passageway tends to open said valve, and an automatic thermostatic means mounted externally of the engine and operatively connected with the valve in such manner that the valve position may be modified by said thermostatic device and the thermostatic device will be controlled by both the engine and the surrounding air temperatures.

12. An internal combustion engine having an exhaust valve port therein, a pair of independent passageways extending from said port adapted to each discharge a portion of the exhaust gases, an intake manifold heating chamber disposed in one of said passageways, a valve disposed in the other of said passageways, means for controlling the valve extending to position outside of the engine, automatic thermostatic control means mounted outside of the engine on said last described means, and a combined air shield and inertia member associated with said last described means adapted to prevent fluttering of the valve and to render the temperature responsive means only partially responsive to the temperature of the air surrounding the engine.

JOHN E. PORTER.